United States Patent
Ko

(10) Patent No.: US 7,940,618 B2
(45) Date of Patent: May 10, 2011

(54) METHOD FOR IDENTIFYING OPTICAL DISC TYPE, DATA RECORDING AND/OR REPRODUCING APPARATUS, AND MEDIUM USING THE SAME

(75) Inventor: Yu-Cheng Ko, Guangdong (CN)

(73) Assignee: Hon Hai Precision Industry Co., Ltd., Tucheng Dist., New Taipei (TW)

( * ) Notice: Subject to any disclaimer, the term of this patent is extended or adjusted under 35 U.S.C. 154(b) by 1163 days.

(21) Appl. No.: 11/561,863

(22) Filed: Nov. 20, 2006

(65) Prior Publication Data

US 2007/0165503 A1    Jul. 19, 2007

(30) Foreign Application Priority Data

Jan. 13, 2006  (CN) .......................... 2006 1 0032957

(51) Int. Cl.
*G11B 19/12* (2006.01)

(52) U.S. Cl. ...................................... 369/53.2

(58) Field of Classification Search ................... None
See application file for complete search history.

(56) References Cited

U.S. PATENT DOCUMENTS

| | | | |
|---|---|---|---|
| 5,764,610 A | 6/1998 | Yoshida et al. | |
| 6,072,757 A | 6/2000 | Tajiri | |
| 6,195,322 B1 * | 2/2001 | Ohtani et al. | 369/53.14 |
| 6,298,024 B1 | 10/2001 | Nomura | |
| 6,317,399 B1 * | 11/2001 | Ohtani et al. | 369/47.44 |
| 6,807,136 B1 | 10/2004 | Grimm | |
| 7,324,418 B2 | 1/2008 | Choi | |
| 2004/0081048 A1 | 4/2004 | Ulf | |
| 2004/0223436 A1 | 11/2004 | Tsai | |
| 2005/0117482 A1 | 6/2005 | Grimm | |

FOREIGN PATENT DOCUMENTS

| | | | |
|---|---|---|---|
| CN | 1694164 A | | 11/2005 |
| JP | 2001195816 A | * | 7/2001 |
| JP | 2006228364 A | * | 8/2006 |
| TW | I231479 | | 4/2005 |

\* cited by examiner

*Primary Examiner* — Brian E Miller
*Assistant Examiner* — Mark L Fischer
(74) *Attorney, Agent, or Firm* — Winston Hsu; Scott Margo

(57) ABSTRACT

A method of identifying a type of a disc includes steps of: obtaining a first address of a first position on the disc; moving a pick-up unit to a second position of the disc; obtaining a second address of the second position; calculating a difference between the first address and the second address; and identifying the type of the disc by comparing the difference with a predetermined value.

13 Claims, 6 Drawing Sheets

METHOD FOR IDENTIFYING OPTICAL DISC TYPE, DATA RECORDING AND/OR REPRODUCING APPARATUS, AND MEDIUM USING THE SAME

BACKGROUND OF THE INVENTION

1. Field of the Invention

This invention relates to data recording and/or reproducing apparatuses and, more particularly, to a method for identifying a type of a disc mounted in a data recording and/or reproducing apparatus.

2. Description of Related Art

All types of data discs, such as compact discs (CDs), video compact discs (VCDs), and digital versatile discs (DVDs), are widely used as storage media for storing vast information. Related data recording and/or reproducing apparatuses are also developed for recording data onto and/or reproducing data from the discs. Generally, a disc includes a read-out surface and a recording layer where a plurality of recording tracks are formed. A data recording and/or reproducing apparatus emits a light beam that is projected on the read-out surface and then reaches the recording layer to record data onto or reproduce data from the disc.

With rapid developments of the data recording and/or reproducing apparatuses, many recording and/or reproducing apparatuses are now required to be operable with as many types of discs as possible. However, different discs may have different inherent formats, such as distances from the read-out surfaces to the recording layers, radial distances between two adjacent tracks (so called track pitch). For example, a distance from the read-out surface to the recording layer of a CD is greater than that of a DVD. In order to properly record data onto or reproduce data from a disc, a wavelength and a power of the light beam should be adjusted according to the type of the disc. Thus, when the disc is mounted in the data recording and/or reproducing apparatus, the first thing the data recording and/or reproducing apparatus does is to identify the type of the disc.

A conventional method for identifying whether a disc is the CD or the DVD is implemented by irradiating light beams with two different wavelengths onto the disc. Because the CD and the DVD have different distances from the read-out surfaces to the recording layers, light beams reflected from the CD and the DVD are different from each other, thereby being capable of discriminating the CD from the DVD.

Following developments of storage technologies, more and more discs such as forward versatile discs (FVDs), and high-density DVDs (HD-DVDs), with small track pitches are introduced. However, the conventional method cannot identify discs that have same distances from the read-out surface to the recording layer but have different track pitches. For example, referring to FIG. 5 and FIG. 6, a track pitch of a DVD is 0.74 µm, while a track pitch of an FVD is 0.64 µm.

Therefore, a method for identifying a type of a disc that can discriminate discs with different track pitches is desired.

SUMMARY OF THE INVENTION

A method of identifying a type of a disc includes steps of: obtaining a first address of a first position on the disc; moving a pick-up unit to a second position of the disc; obtaining a second address of the second position; calculating a difference between the first address and the second address; and identifying the type of the disc by comparing the difference with a predetermined value.

A data recording and/or reproducing apparatus is provided for recording data onto and/or reproducing data from a disc. The data recording and/or reproducing apparatus includes a first driving unit, an optical pick-up unit, a second driving unit, a servo control unit, and a controller. The first driving unit is constructed for controlling the disc to rotate. The optical pick-up unit is constructed for emitting a light beam onto a track of the disc and detecting a reflected light beam from the disc. The second driving unit is constructed for driving the optical pick-up unit to move along a radial direction of the disc. The servo control unit is constructed for controlling the first driving unit to drive the disc to rotate and controlling the second driving unit to drive the optical pick-up unit to move. The controller is constructed for sending commands to the servo control unit to have the servo control unit control the second driving unit to drive the optical pick-up unit to move from a first position to a second position. The controller is also constructed for extracting a first address of the first position and a second address of the second position from reflected light beam from the disc. The controller is further constructed for identifying a type of the disc by comparing a difference between the first address and the second address with a predetermined value.

A storage medium is provided for storing a computer-executable program. The program has computer executable steps of: obtaining a first address of a first position on the disc; moving a pick-up unit to a second position of the disc; obtaining a second address of the second position; calculating a difference between the first address and the second address; and identifying the type of the disc by comparing the difference with a predetermined value.

Other advantages and novel features will become more apparent from the following detailed description of preferred embodiments when taken in conjunction with the accompanying drawings, in which:

BRIEF DESCRIPTION OF THE DRAWINGS

Many aspects of the data recording and/or reproducing apparatus and method for identifying a type of a disc mounted in the data recording and/or reproducing apparatus can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF THE INVENTION

Reference will now be made to the drawings to describe the preferred embodiment of the present data recording and/or reproducing apparatus and the present method for identifying a type of a disc, in detail.

Figure 1:
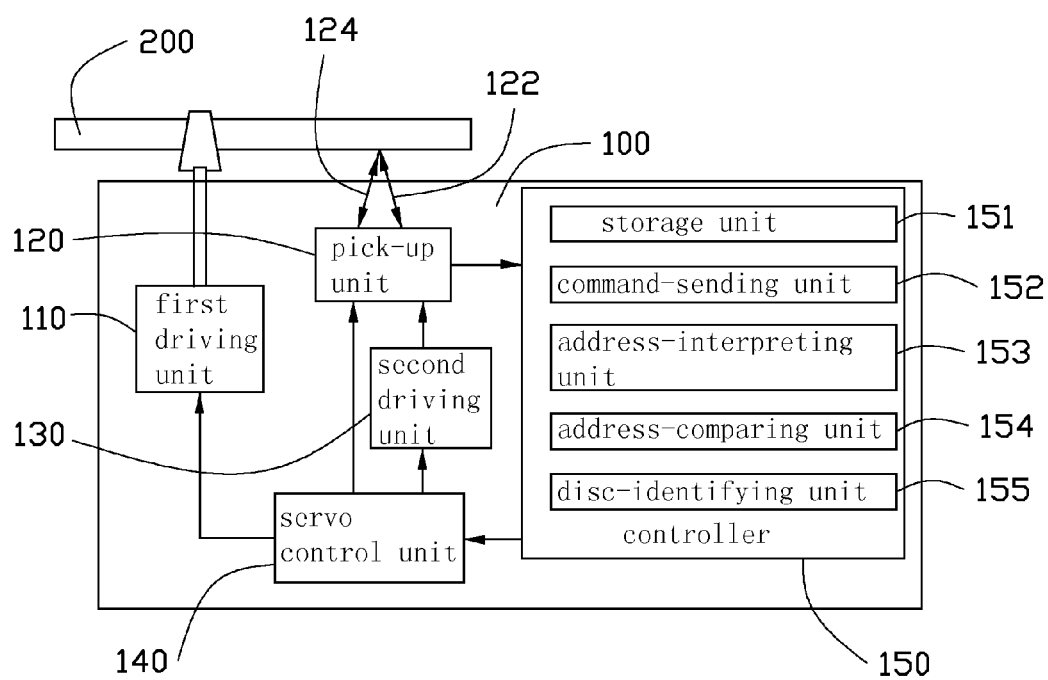
FIG. 1 is a block diagram of a data recording and/or reproducing apparatus in accordance with an exemplary embodiment.

Referring to FIG. 1, a data recording and/or reproducing apparatus 100 for recording data onto and/or reproducing data from a disc 200, includes a first driving unit 110, a pick-up unit 120, a second driving unit 130, a servo control unit 140, and a controller 150.

The first driving unit 110 is used for rotating the disc 200.

The pick-up unit 120 is used for emitting and focusing a light beam 122 on the disc 200, detecting a reflected light beam 124 from the disc 200, transforming the reflected light beam 124 from the disc 200 into electrical signals, and transmitting the electrical signals to the controller 150.

The second driving unit 130 is used for moving the pick-up unit 120 along a radial direction relative to the disc 200.

The servo control unit 140 is used for performing servo control operations; such servo control operations include controlling the first driving unit 110 to rotate the disc 200 and controlling the second driving unit 130 to move the pick-up unit 120. For example, the servo control unit 140 sends instruction commands to instruct the first driving unit 110 to adjust a rotating speed of the disc 200, or sends instruction commands to instruct the second driving unit 130 to move the pick-up unit 120 to a predetermined position relative to the disc 200, so as to accurately focus the light beam 122 on a predetermined track of the disc 200.

The controller 150 is used for receiving the electrical signals from the pick-up unit 120, and reproducing data recorded on the disc 200 based on the electrical signals. The controller 150 is further used for extracting data on servo control that includes tracking error signals and focusing error signals from the electrical signals. Based on the data on servo control, the controller 150 controls the servo control unit 140 to perform servo control operations.

The controller 150 includes a storage unit 151, a command-sending unit 152, an address-interpreting unit 153, an address-comparing unit 154, and a disc-identifying unit 155.

The storage unit 151 is used for storing a predetermined value of a distance D (referring to FIG. 2) and a predetermined value of an address difference. The distance D is a radial distance from a first track to a second track on the disc 200. In order to ease descriptions, it is presumed that the second driving unit 130 is a stepping motor whose rotation moves the pick-up unit 120 along the radial direction relative to the disc 200. A full rotation of the stepping motor can be divided into 320 steps, and can move the pick-up unit 120 a distance of 3 mm along the radial direction relative to the disc 200. Accordingly, the number of the steps of the stepping motor can be used to reflect the predetermined distance D. For example, if the number of the steps that is used to reflect the predetermined distance D is 1000, then the predetermined distance D is 9375 µm (1000*3 mm/320).

The command-sending unit 152 is used for generating jumping instruction commands to the second driving unit 130, thus moving the pick-up unit 120 from the first track to the second track.

The address-interpreting unit 153 is used for computing information on an address of a track where the light beam emitted by the pick-up unit 120 focuses by the electrical signals outputted by the pick-up unit 120.

The address-comparing unit 154 is used for comparing the address of the first track with the address of the second track to obtain an address difference between the first track and the second track.

The disc-identifying unit 155 is used for identifying a type of the disc 200 by comparing the address difference between the first track and the second track with the predetermined address difference. Since the disc of the first type has a relatively small track pitch than the disc of the second type, if the address difference is greater than the predetermined address difference, the disc 200 is identified as the first type. Otherwise, the disc is identified as the second type.

Figure 2:
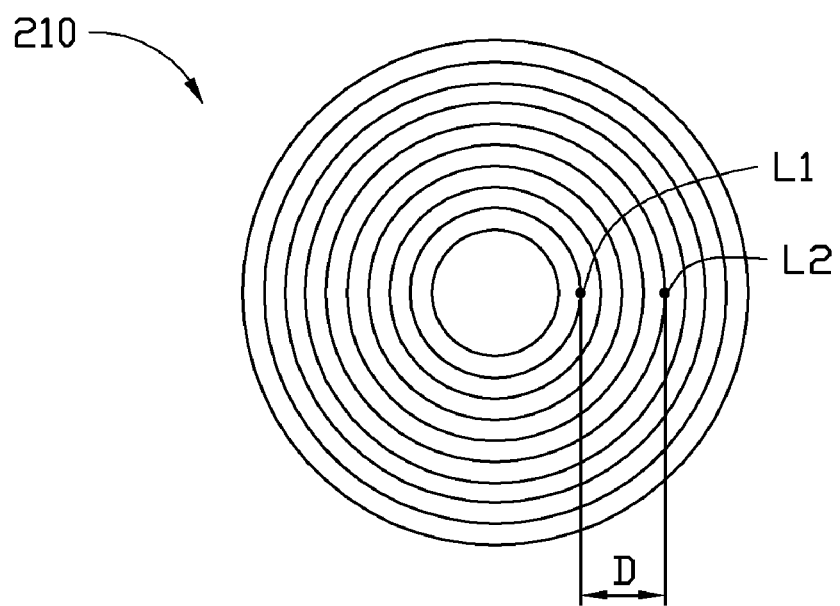
FIG. 2 is a schematic diagram showing a disc with a small track pitch.
Figure 3:
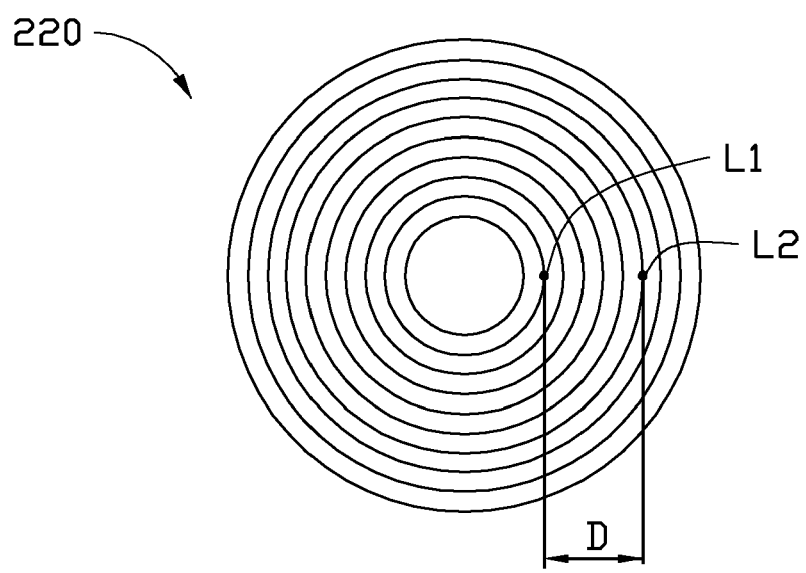
FIG. 3 is a schematic diagram showing a disc with a great track pitch.

Referring to FIG. 2 and FIG. 3, two exemplary discs with different track pitches are illustrated. A disc 210 of the first type has relatively small track pitches and includes many tracks. Each track has a unique address used for identifying the track. Along a radial direction relative to the disc 210 of the first type, two positions L1 and L2 are located on two different tracks. A radial distance between the two positions L1 and L2 is equal to the predetermined distance D. By comparing addresses between the two different tracks, a first address difference is obtained. Similarly, two different positions L1' and L2' are located on two different tracks of a disc 220 of the second type, and a radial distance between the two positions L1' and L2' is equal to the predetermined distance D. A second address difference is obtained by comparing addresses of the two different tracks. Since the disc 220 of the second type has greater track pitches than the disc 210 of the first type, the second address difference is greater than the first address difference. If the predetermined address difference is less than the second address difference but greater than the first address difference, then, by comparing the first/second address differences with the predetermined address difference the disc 210 can be distinguished as the first type or as the second type.

In this embodiment, the data recording and/or reproducing apparatus 1 is operable on two types of discs, for example, a DVD and a FVD. Thus, only one predetermined address difference is needed to identify between the two types of discs. In other embodiments, the data recording and/or reproducing apparatus 1 can be operable on more than two types of discs. In this instance, the number of the predetermined address difference should be equal to the number of the types of the discs subtracted by 1. For example, if the data recording and/or reproducing apparatus 1 is operable on three types of discs, the number of the predetermined address difference should be two.

Figure 4:
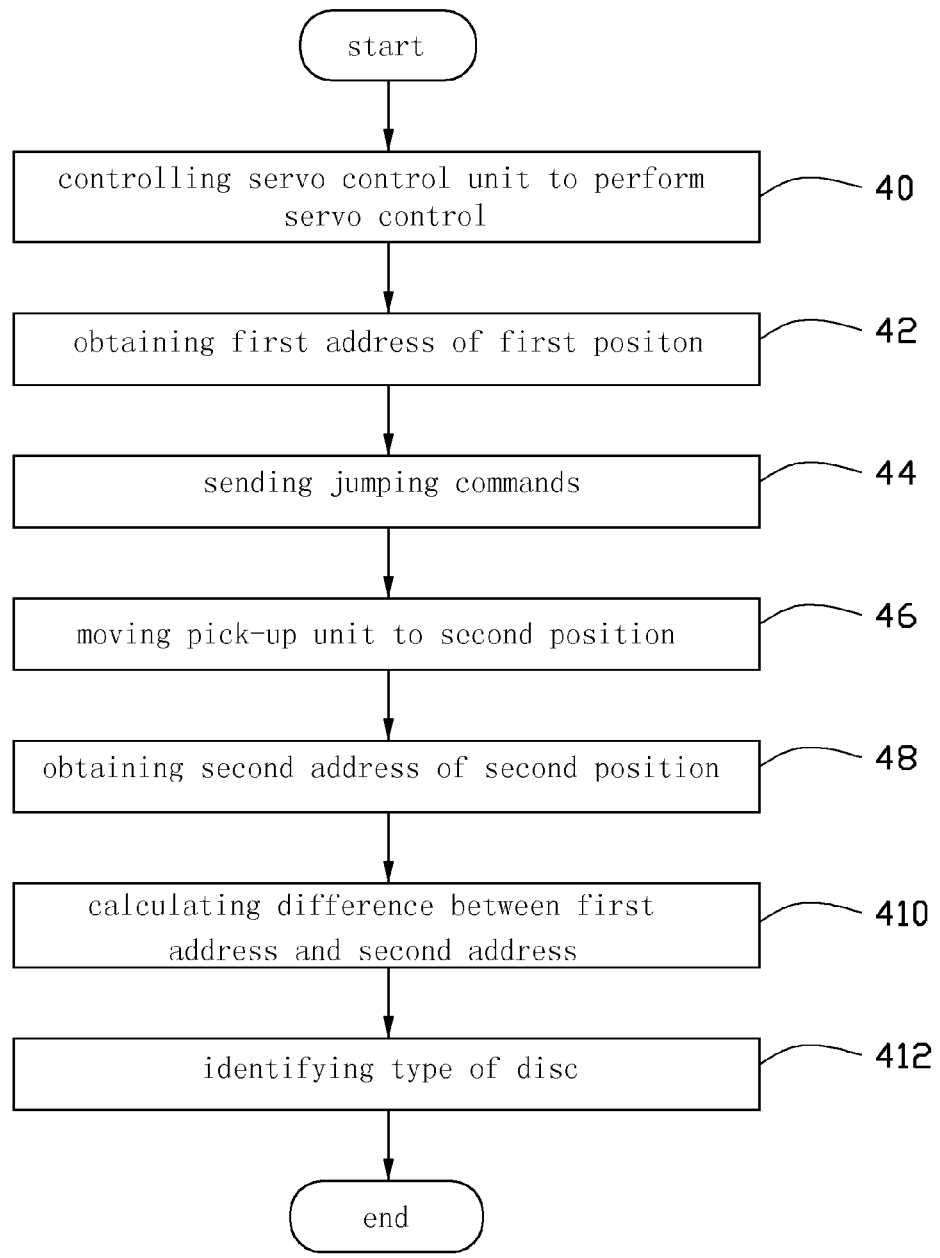
FIG. 4 is a flow chart illustrating an identifying procedure of a method for identifying a type of a disc in accordance with an exemplary embodiment.
Figure 5:
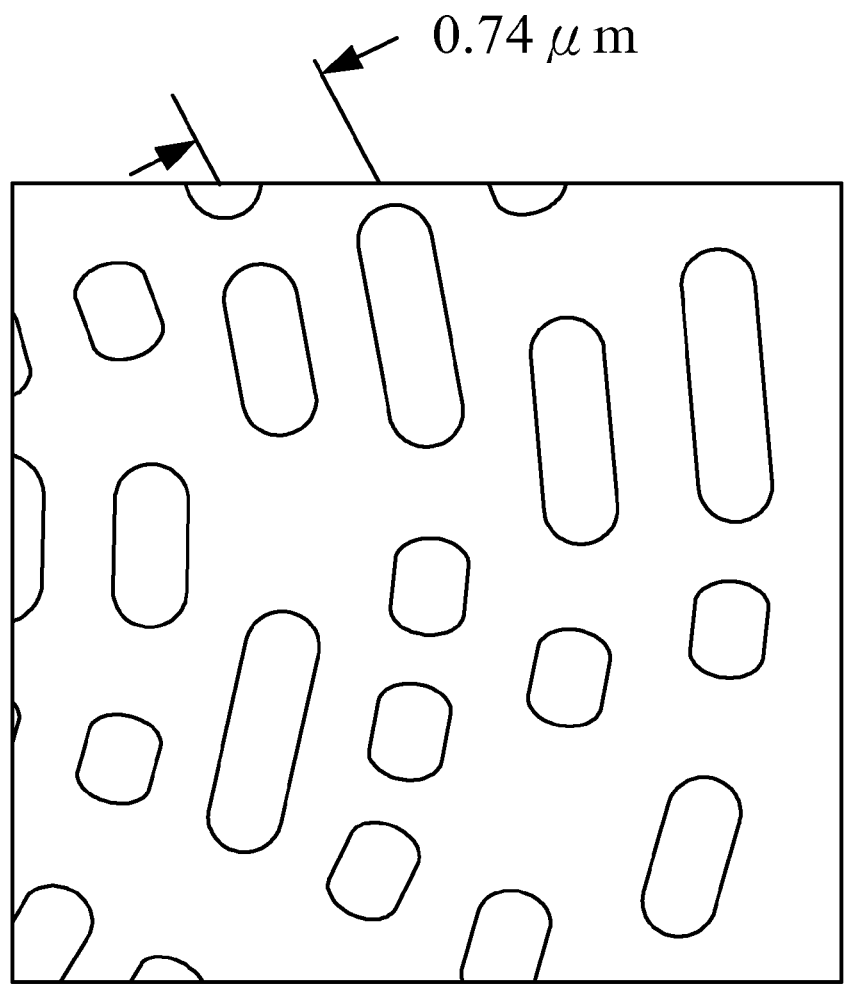
FIG. 5 is a schematic diagram showing tracks of a DVD.
Figure 6:
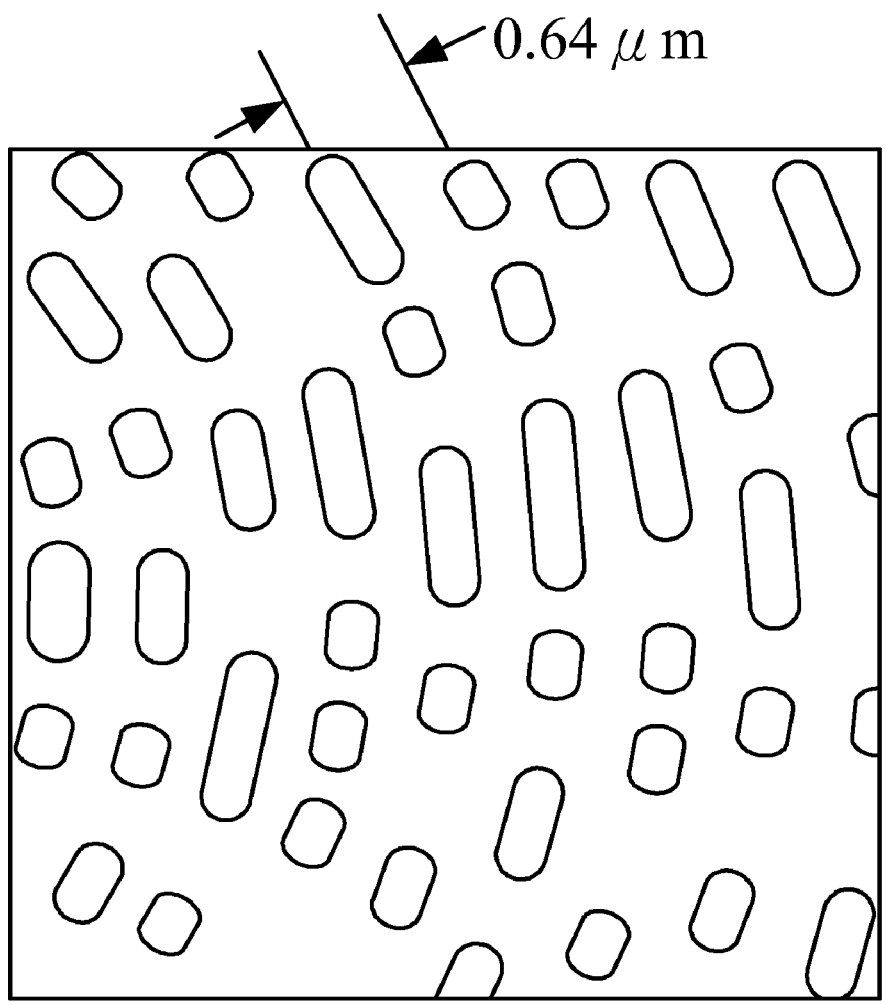
FIG. 6 is schematic diagram showing tracks of a FVD.

Referring to FIG. 4, an identifying procedure of a method for identifying a type of the disc 200 mounted in the data recording and/or reproducing apparatus 1 is illustrated. First, in step 40, the controller 150 controls the servo control unit 140 to perform servo control operations. The disc 200 is rotated by the first driving unit 110, and the pick-up unit 120 is moved by the second driving unit 130 along the radial direction relative to the disc 200.

Second, in step 42, at the first track, the pick-up unit 120 emits the light beam onto the first track of the disc 200, detects a reflected light beam 124 from the disc 200 and generates electrical signals. Based on the electrical signals, a first address A1 of the first track is obtained.

Third, in step 44, the command-sending unit 152 sends jumping instruction commands to the second driving unit 130 to move the pick-up unit 120 the predetermined distance from the first track along the radial direction of the disc 200.

Fourth, step 46, the pick-up unit 120 is moved the radial distance of the predetermined distance to the second track and emits the light beam onto the second track.

Fifth, step 48, the pick-up unit 120 detects a reflected light beam 124 from the disc 200 and generates electrical signals based on the reflected light beam 124 from the disc. Based on the electrical signals, a second address A2 of the second track is obtained.

sixth, step 410, the address difference |A2−A1| between the first address A1 and the second address A2 is obtained by comparing the first address A1 with the second address A2.

Finally, step 412, the type of the disc 200 is identified by comparing the address difference |A2−A1| with the predetermined address difference. If the address difference |A2−A1| is greater than the predetermined address difference, the disc 200 is identified as a disc (for example, the disc 210 of the first type) that has a relatively small track pitch. If the difference |A2−A1| is less than the predetermined address difference, the disc 200 is identified as a disc (for example, the disc 220 of the second type) that has a relatively large track pitch.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A method of identifying a type of a disc, comprising:
   obtaining a first address of a first position of a pick-up unit on the disc;
   radially moving the pick-up unit from the first position to a second position of the disc;
   obtaining a second address of the second position;
   calculating a difference between the first address and the second address;
   identifying the disc as a disc of a first type if the difference is greater than a predetermined value; and
   identifying the disc as a disc of a second type having a greater track pitch than the disc of the first type if the difference is less than the predetermined value.

2. The method as claimed in claim 1, wherein the step of obtaining the first address comprises steps of:
   emitting a light beam onto the first position of the disc;
   detecting a reflected light beam from the disc; and
   extracting the first address from the reflected light beam from the disc.

3. The method as claimed in claim 1, wherein the step of obtaining the second address comprises steps of:
   emitting a light beam onto the second position of the disc;
   detecting a reflected light beam from the disc; and
   extracting the second address from the reflected light beam from the disc.

4. The method as claimed in claim 1, wherein a radial distance between the first position and the second position is a predetermined distance.

5. The method as claimed in claim 4, wherein the step of moving comprises steps of:
   generating commands based on the predetermined distance; and
   sending the commands to a servo control unit to have the servo control unit instruct a driving unit to drive the pick-up unit to move along a radial direction of the disc to the second position.

6. A data recording and/or reproducing apparatus for recording data onto and/or reproducing data from a disc, comprising:
   a first driving unit for controlling the disc to rotate;
   an optical pick-up unit for emitting a light beam onto a track of the disc, detecting a reflected light beam from the disc, and transforming the reflected light beam into electrical signals;
   a second driving unit for driving the optical pick-up unit to move along a radial direction of the disc;
   a servo control unit for controlling the first driving unit to drive the disc to rotate and controlling the second driving unit to drive the optical pick-up unit to move; and
   a controller receiving the electrical signals from the pick-up unit and sending commands to the servo control unit to have the servo control unit control the second driving unit to drive the optical pick-up unit to move from a first position to a second position, for extracting a first address of the first position and a second address of the second position, and for identifying a type of the disc by comparing a difference between the first address and the second address with a predetermined value;
   wherein the controller further comprises a storage unit for storing a predetermined distance and the predetermined value, the predetermined distance being equal to a radial distance between the first position and the second position, the commands sent by the controller to the servo control unit being based on the predetermined distance.

7. The data recording and/or reproducing apparatus as claimed in claim 6, wherein the controller comprises a command-sending unit for generating the commands based on the predetermined distance and for sending the commands to the servo control unit.

8. The data recording and/or reproducing apparatus as claimed in claim 6, wherein the controller comprises an address-interpreting unit for extracting the first address based on a reflected light beam from the first position and the second address based on a reflected light beam from the second position.

9. The data recording and/or reproducing apparatus as claimed in claim 6, wherein the controller comprises a disc-identifying unit for identifying the type of the disc by comparing the difference between the first address and the second address with the predetermined value.

10. The data recording and/or reproducing apparatus as claimed in claim 9, wherein the disc-identifying unit identifies the disc as a disc of a first type if the difference is greater than the predetermined value, and identifies the disc as a disc of a second type having a greater track pitch than the disc of the first type if the difference is less than the predetermined value.

11. A non-transitory storage medium storing a computer-executable program for a data recording and/or reproducing apparatus, the program for making the data recording and/or reproducing apparatus identify a type of disc, the program having computer executable code for making the data recording and/or reproducing apparatus execute:
   obtaining a first address of a first position of a pick-up unit on a disc;
   radially moving the pick-up unit from the first position to a second position of the disc;
   obtaining a second address of the second position;
   calculating a difference between the first address and the second address;
   identifying the disc as a disc of a first type if the difference is greater than a predetermined value; and
   identifying the disc as a disc of a second type having a greater track pitch than the disc of the first type if the difference is less than the predetermined value.

12. The non-transitory storage medium as claimed in claim 11, wherein the step of obtaining the first address comprises steps of:
   emitting a light beam onto the first position;
   detecting a reflected light beam from the first position; and
   extracting the first address from the reflected light beam from the first position.

13. The non-transitory storage medium as claimed in claim 11, wherein the step of obtaining the second address comprises steps of:
   emitting a light beam onto the second position;
   detecting a reflected light beam from the second position; and
   extracting the second address from the reflected light beam from the second position.

* * * * *